US011447340B1

(12) United States Patent
Toquica et al.

(10) Patent No.: US 11,447,340 B1
(45) Date of Patent: Sep. 20, 2022

(54) MODULAR FRAME INTERFACE

(71) Applicant: Osgood Industries, LLC, Oldsmar, FL (US)

(72) Inventors: Cristian Toquica, Riverview, FL (US); Brandon Hallinan, Land O' Lakes, FL (US)

(73) Assignee: OSGOOD INDUSTRIES, LLC, Oldsmar, FL (US)

( * ) Notice: Subject to any disclaimer, the term of this patent is extended or adjusted under 35 U.S.C. 154(b) by 0 days.

(21) Appl. No.: 17/205,599

(22) Filed: Mar. 18, 2021

(51) Int. Cl.
*B65G 21/12* (2006.01)
*B65G 21/00* (2006.01)
*B65B 43/52* (2006.01)
*B65G 17/26* (2006.01)
*B65B 7/28* (2006.01)
*B65B 3/04* (2006.01)

(52) U.S. Cl.
CPC ............. *B65G 17/26* (2013.01); *B65B 43/52* (2013.01); *B65B 3/04* (2013.01); *B65B 7/2878* (2013.01)

(58) Field of Classification Search
CPC ........ B65G 17/26; B65G 21/12; B65G 21/00; B65B 43/52
USPC ............................................ 198/339.1, 860.2
See application file for complete search history.

(56) References Cited

U.S. PATENT DOCUMENTS

| 3,122,987 A | 3/1964 | Ruhnke | |
|---|---|---|---|
| 4,433,881 A | 2/1984 | Witten et al. | |
| 4,467,914 A * | 8/1984 | Trammel | B65G 21/02 138/155 |
| 4,628,974 A * | 12/1986 | Meyer | B67D 1/0021 901/17 |
| 4,844,565 A | 7/1989 | Brafford et al. | |
| 5,188,479 A * | 2/1993 | Nehls | F16B 19/1081 403/306 |
| 5,598,784 A * | 2/1997 | Kubsik | B65G 21/06 104/111 |
| 6,443,542 B1 | 9/2002 | Lindquist et al. | |
| 6,705,461 B2 * | 3/2004 | Kuharevicz | B65G 21/06 198/861.2 |
| 6,854,397 B2 * | 2/2005 | Terajima | B65G 21/06 198/841 |

(Continued)

OTHER PUBLICATIONS

US 2005/0211534 A1, Tefund, Sep. 29, 2005.*
US 2009/0248190 A1, Spangler, Oct. 1, 2009.*

*Primary Examiner* — Douglas A Hess
(74) *Attorney, Agent, or Firm* — Michael Best & Friedrich LLP

(57) ABSTRACT

A modular processing machine includes a first module comprising a first mounting plate including a first hole, and a first rail extending along a longitudinal axis, the first rail having a first axial end facing the first hole, the first hole being coaxially aligned with the longitudinal axis. A second module comprises a second mounting plate including a second hole coaxially aligned with the longitudinal axis, and a second rail extending coaxially aligned with the longitudinal axis, the second rail having a second axial end facing the second hole. The first rail has a first alignment feature at the first axial end thereof, and the second rail has a second alignment feature at the second axial end thereof. The first alignment feature is engaged with the second alignment feature to coaxially align the first rail with the second rail along the longitudinal axis.

24 Claims, 13 Drawing Sheets

(56) References Cited

U.S. PATENT DOCUMENTS

| | | | |
|---|---|---|---|
| 6,889,824 B2* | 5/2005 | Leisner | B65G 21/06 |
| | | | 198/860.1 |
| 6,955,410 B1 | 10/2005 | Nelson et al. | |
| 7,673,741 B2* | 3/2010 | Nemedi | B65G 15/42 |
| | | | 198/836.2 |
| 7,722,141 B2 | 5/2010 | Parise et al. | |
| 7,837,030 B2* | 11/2010 | Daly | B65G 21/06 |
| | | | 198/822 |
| 8,360,225 B2* | 1/2013 | Spangler | B65G 35/066 |
| | | | 198/345.3 |
| 8,925,718 B2* | 1/2015 | Miles | B65G 21/06 |
| | | | 198/860.1 |
| 9,290,328 B2* | 3/2016 | Landolt | B65G 17/20 |
| 9,410,740 B2* | 8/2016 | Yu | F26B 15/06 |
| 2005/0212241 A1 | 9/2005 | Stone | |
| 2018/0146817 A1 | 5/2018 | Piras et al. | |
| 2019/0166874 A1 | 6/2019 | Douer | |
| 2020/0154949 A1 | 5/2020 | Klein et al. | |

* cited by examiner

MODULAR FRAME INTERFACE

FIELD OF THE DISCLOSURE

The present disclosure relates to a modular machine frame, and more particularly to structures for obtaining alignment between the modules of the modular machine frame.

BACKGROUND OF THE INVENTION

Cup filling and sealing apparatuses are used to fill and contain comestibles in liquid or semi-liquid form within a cup. Various steps of packaging a comestible within a cup are performed in series. Such steps may include filling, sealing, and capping the cup. Some existing cup filling and sealing apparatuses include a conveyor for passing cups between modules of the cup filling and sealing apparatus. Thus, the conveyor relies on the structure of each individual module for its mounting points, and may require high precision alignment and/or mounting features at the expense of low cost and simplicity.

SUMMARY OF THE INVENTION

The present invention provides, in one aspect, a modular processing machine including a plurality of process units for completing a series of sequential tasks on a work piece conveyed through the modular processing machine. The modular processing machine comprises a first module and a second module. The first module comprises a first mounting plate including a first hole, and a first rail extending along a longitudinal axis, the first rail having a first axial end facing the first hole, the first hole being coaxially aligned with the longitudinal axis. The second module comprises a second mounting plate including a second hole coaxially aligned with the longitudinal axis, and a second rail extending coaxially with the longitudinal axis, the second rail having a second axial end facing the second hole. The first rail has a first alignment feature at the first axial end thereof protruding longitudinally from the first hole of the first mounting plate, and the second rail has a second alignment feature at the second axial end thereof protruding longitudinally from the second hole of the second mounting plate. The first alignment feature is engaged with the second alignment feature to coaxially align the first rail with the second rail along the longitudinal axis.

The present invention provides, in another aspect, a modular processing machine including a plurality of process units for completing a series of sequential tasks on a work piece conveyed through the modular processing machine. The modular processing machine comprises a first module including a first mounting plate including a first hole and a first rail extending along a longitudinal axis, the first hole having a first axial end facing the first hole, and the first hole being coaxially aligned with the longitudinal axis. The modular processing machine further comprises a second module including a second mounting plate including a second hole coaxially aligned with the longitudinal axis and a second rail extending coaxially with the longitudinal axis, the second rail having a second axial end facing the second hole. The first rail has a first alignment feature at a first axial end thereof protruding longitudinally from the first hole, and the second rail has a second alignment feature at the second axial end thereof protruding longitudinally from the second hole of the second mounting plate, and the first alignment feature is engaged with the second alignment feature to coaxially align the first rail and the second rail along the longitudinal axis. The modular processing machine further comprises a first process unit mounted on the first rail for completing a first task of the series of sequential tasks. The modular processing machine further comprises a second process unit mounted on the second rail for completing a second tasks of the series of sequential tasks, the second tasks being completed sequentially after the first task.

The present invention provides, in another aspect, a modular processing machine including a plurality of process units for completing a series of sequential tasks on a work piece conveyed through the modular processing machine. The modular processing machine comprises a first module including a plurality of first rails extending parallel to each other, and a first process unit mounted on the plurality of first rails. The modular processing machine further comprises a second module including a plurality of second rails extending parallel to each other, and a second process unit mounted on the plurality of second rails. The modular processing machine further comprises a conveyor extending between the first module and the second module and defining a process flow direction from an upstream end of the first module towards a downstream end of the second module. A plurality of male-female interfaces between the plurality of first rails and the plurality of second rails sets the plurality of first rails and the plurality of second rails to extend parallel to the process flow direction, and attachment between the first module and the second module is established by fastener joints separate from the plurality of male-female interfaces.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
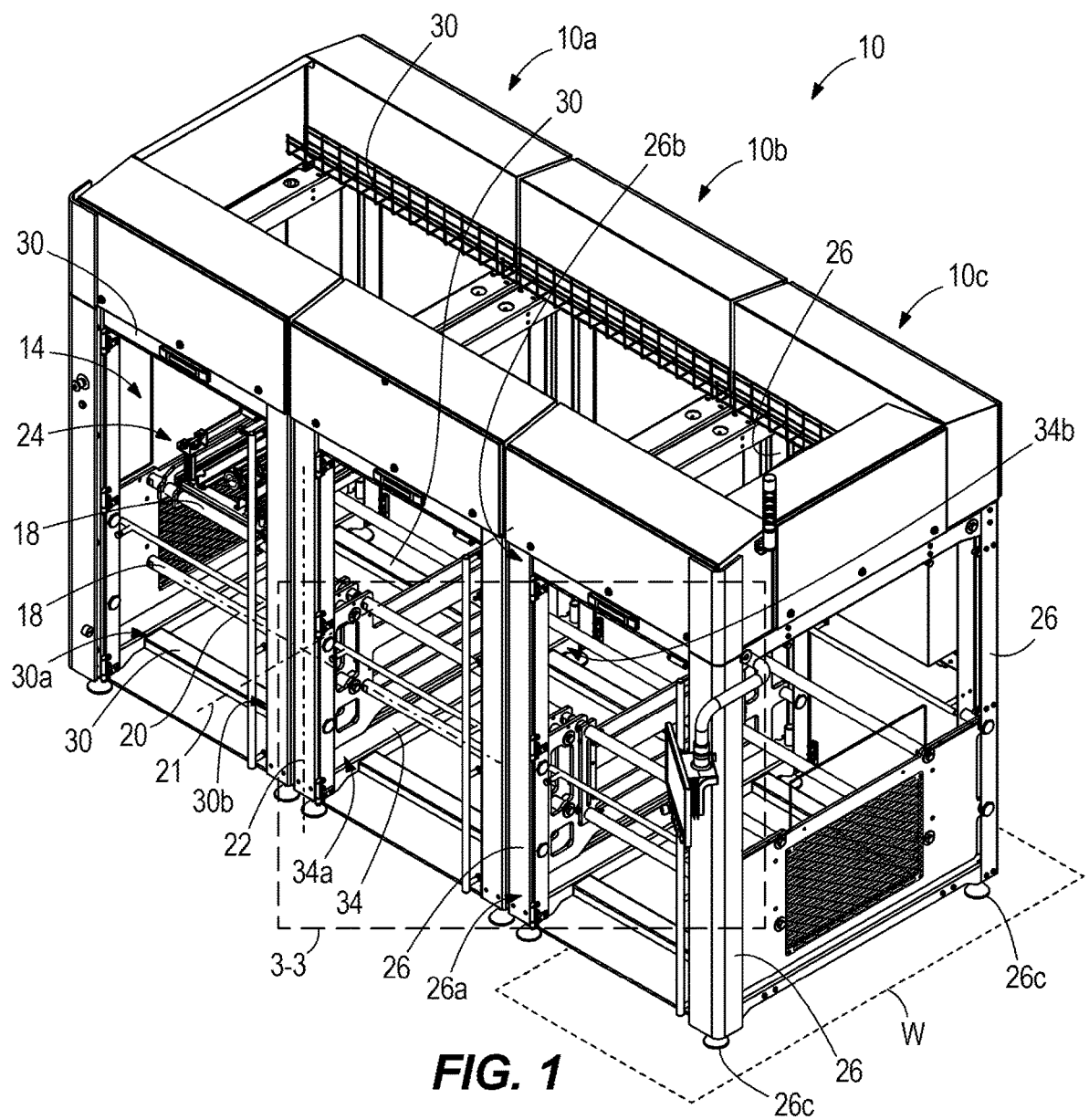
FIG. 1 is a perspective view of a modular machine system.

FIG. 1 illustrates a cup filling and sealing apparatus 10 which is subdivided into three modules 10a, 10b, and 10c and supported by a work surface W. Each module 10a-10c includes a frame 14. Each frame 14 further comprises rails 18 which operatively align the three modules 10a-10c. The rails 18 support at least one functional process unit 24. Each rail 18 extends parallel to a longitudinal axis 20 defined by the center of one of the rails 18 such that the rails 18 of each of the three modules 10a-10c are aligned axially along the longitudinal axis 20. As will be discussed below, the interconnection of the modules 10a-10c through the rails 18 retains the alignment of each module 10a-10c such that the process units 24 mounted on the rails 18 are mounted in an aligned and predetermined location and orientation on the rails 18.

The functional process units 24 of the illustrated apparatus 10 relate to operations for a cup filling and sealing process for filling and sealing comestibles within a cup (not shown). However, the modules 10a-10c, frames 14, and rails 18 may be used in other contexts.

As markets change and user needs adapt, functions may need to be added or removed from the apparatus 10. For example, the apparatus 10 may be expanded to include an additional module 10d having a process unit 24 capable of disinfecting the cup. In some situations, it is important that the apparatus 10 has each functional process unit 24 installed adjacent an existing functional process unit 24. For example, an exemplary process unit 24 operable to apply comestibles to the cup may need to be located adjacent another exemplary process unit 24 operable to apply a cap to the cup to protect the comestibles from the environment. In some constructions, the apparatus 10 is self-contained in a relatively small package which can be readily transported to and positioned adjacent any one of several sources of comestibles being packaged.

The apparatus 10 allows for fully customizable layout of the module 10a-10c and permits various different functional process units 24 to be mounted within each module 10a-10c for completing various tasks related to cup filling and sealing. As a result, the number of repeated parts in the apparatus 10 is increased, and the number of unique parts is decreased. Individual modules 10a-10c can be assembled, tested, and shipped to the end user quickly and economically. The modules 10a-10c can be connected at a manufacturing site and shipped to the end user. Similarly, individual functional process units 24 can be assembled, tested, and shipped to the user quickly and economically for connection to a module 10a-10c at the site of the apparatus 10. Further, the end user is able to disassemble parts of the apparatus 10 and rebuild it in a different configuration, i.e., with a different particular arrangement of the modules 10a-10c (or additional modules not shown herein).

In the illustrated embodiment of FIG. 1, each frame 14 is generally in the form of a rectangular prism. The frame 14 has a length along the longitudinal axis 20, a width along a lateral axis 21 perpendicular to the longitudinal axis 20, and a height along a vertical axis 22 perpendicular to both the longitudinal axis 20 and the lateral axis 21. Each frame 14 includes a plurality of columns 26 (e.g., four columns) extending parallel to the vertical axis 22 from a lower end 26a to an upper end 26b, longitudinal members 30 extending parallel to the longitudinal axis 20 and connecting adjacent columns 26 along the longitudinal axis 20 from an upstream end 30a to a downstream end 30b, and lateral members 34 extending between adjacent columns 26 parallel to the lateral axis 21 from a first lateral end 34a to a second lateral end 34b. The upstream end 30a and the downstream end 30b also generally define an upstream end 30a and downstream end 30b of the module 10a. The illustrated embodiment includes two longitudinal members 30 and two lateral members 34 located adjacent the lower end 26a and the upper end 26b to interconnect each of the columns 26. In the illustrated embodiment, the lower ends 26a of the respective columns are supported on the work surface W by respective feet 26c. In other constructions, the frames 14 or portions thereof are modified to take other forms so as to change the various dimensional aspect ratios, the number or shape of frame members, and/or the placement thereof.

Figure 5:
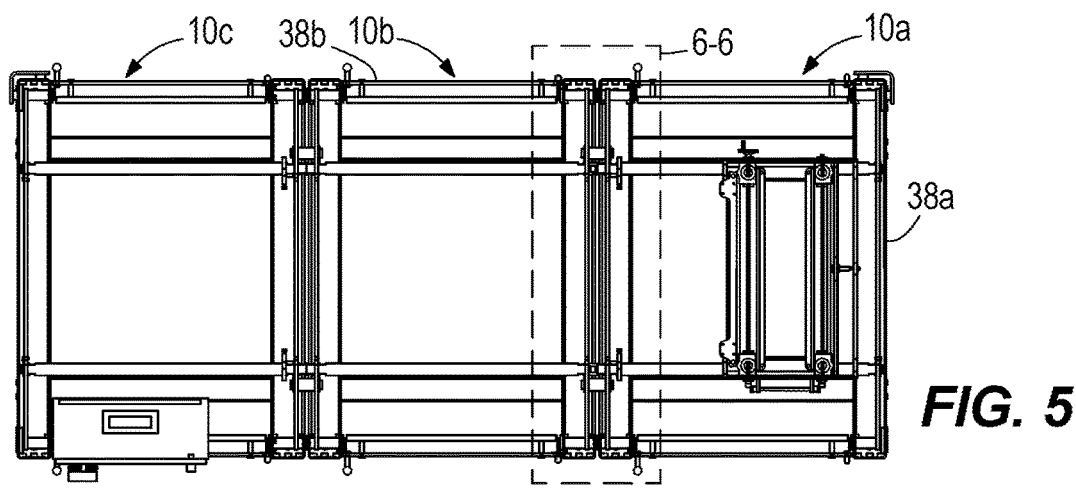
FIG. 5 is a cross-sectional view of the modular machine system of FIG. 1 taken along section line 5-5 in FIG. 4.
Figure 6:
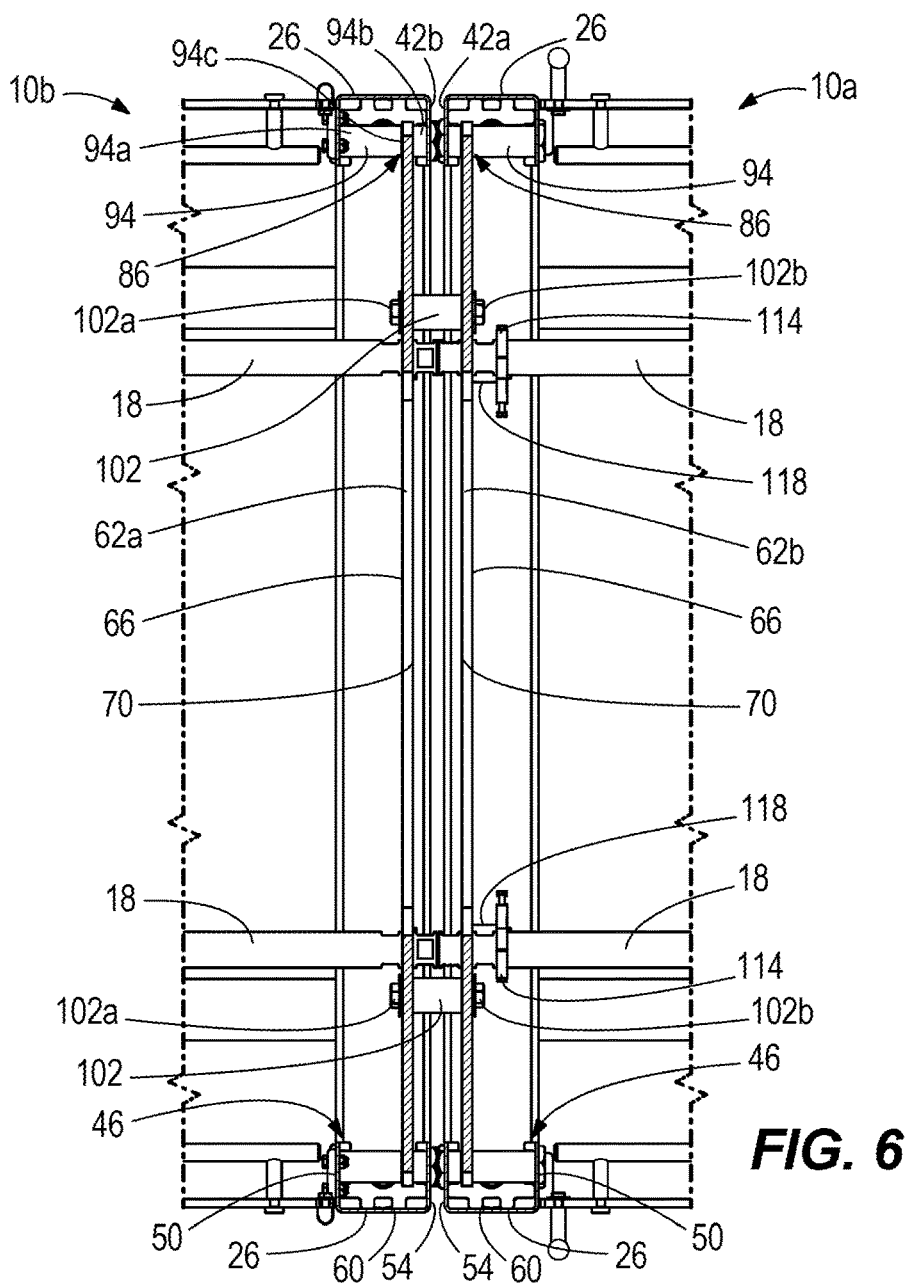
FIG. 6 is an enlarged cross-sectional view of the modular machine system of FIG. 1 taken along section line 6-6 in FIG. 5.

As shown in FIG. 5, the columns 26 of the first module define a periphery 38a of the rectangular prism-shaped frame 14 of the first module 10a. The periphery 38a of the frame 14 of the first module 10a does not interfere with a periphery 38B of the frame 14 of the second module 10b. In fact, the periphery 38a of the first module 10a is spaced from the periphery 38B of the second module 10b. As illustrated in FIG. 6, the columns 26 of the first module 10a have an outer surface 42a that is axially located at a position along the longitudinal axis 20 spaced from the columns 26 of the second module 10b. Similarly, the columns 26 of the second module 10b have an outer surface 42b that is axially located at a position along the longitudinal axis 20 spaced from the columns 26 of the first module 10a.

With reference to FIGS. 5 and 6, each column 26 has a cross sectional profile 46 taken perpendicular to the vertical axis 22 that is a C-channel. Each column 26 has an inwardly facing channel arm 50, an outwardly facing channel arm 54, and a channel body 60 spanning the channel arms 50, 54. In the frame 14, the inwardly facing channel arm 50 faces the longitudinal center of the frame 14. In the frame 14, the outwardly facing channel arm 54 faces away from the longitudinal center of the frame 14. In the frame 14, adjacent columns 26 in the lateral direction (i.e., columns aligned along a common lateral axis 21) have channel bodies 60 which face each other. In the frame 14, adjacent columns 26 in the longitudinal direction (i.e., columns aligned parallel with respect to each other along the longitudinal axis 20)

have respective channel arms 50, 54 which face each other. The channel body 60 is in a plane defined by the longitudinal axis 20 and the vertical axis 22. The channel arms 50, 54 are in separate planes defined by the lateral axis 21 and the vertical axis 22. As such, the channel arms 50, 54 extend laterally (i.e., perpendicularly from the longitudinal axis 20).

Figure 3:
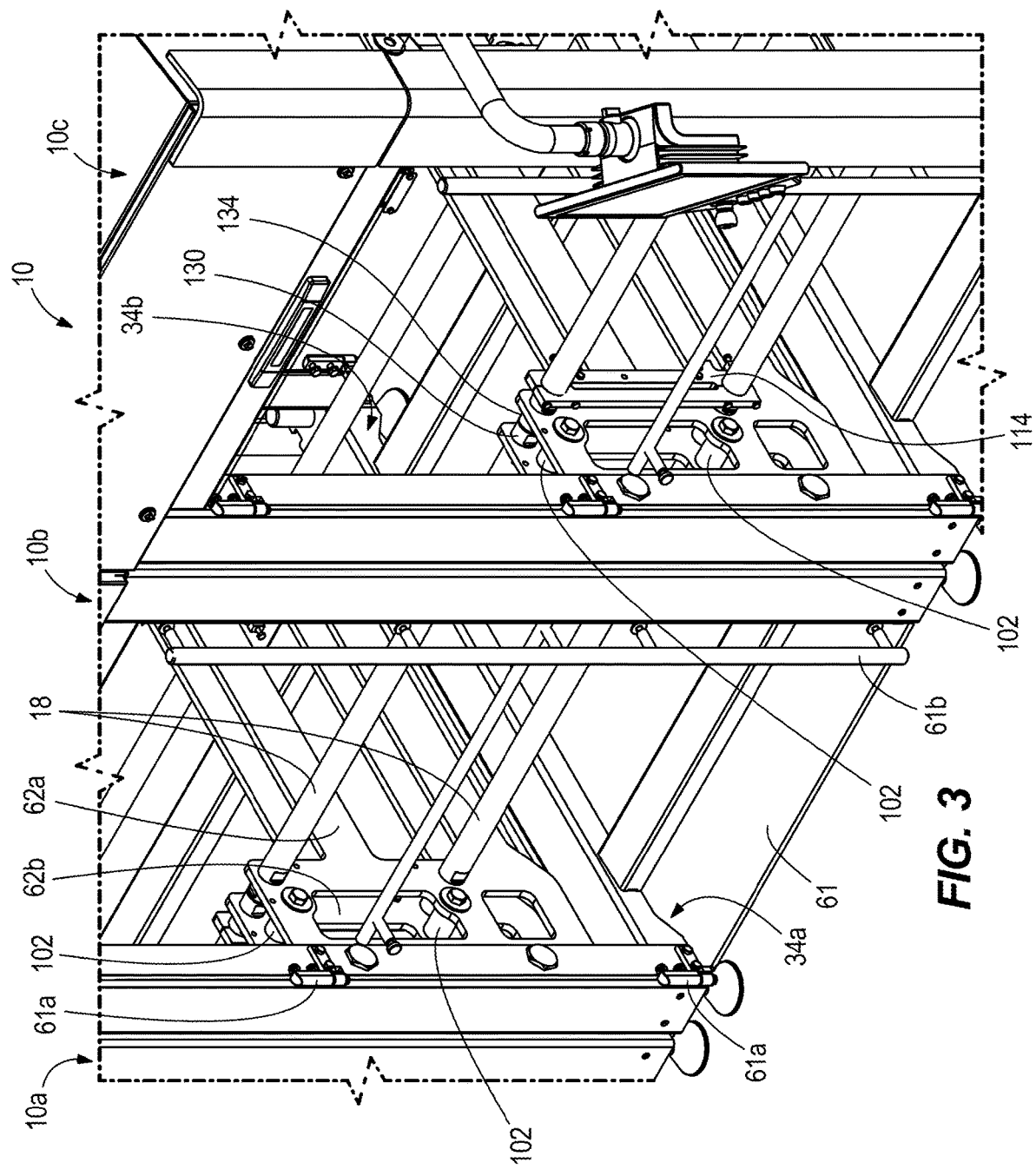
FIG. 3 is an enlarged perspective view of the modular machine system of FIG. 1 taken along section line 3-3 in FIG. 1.
Figure 3A:
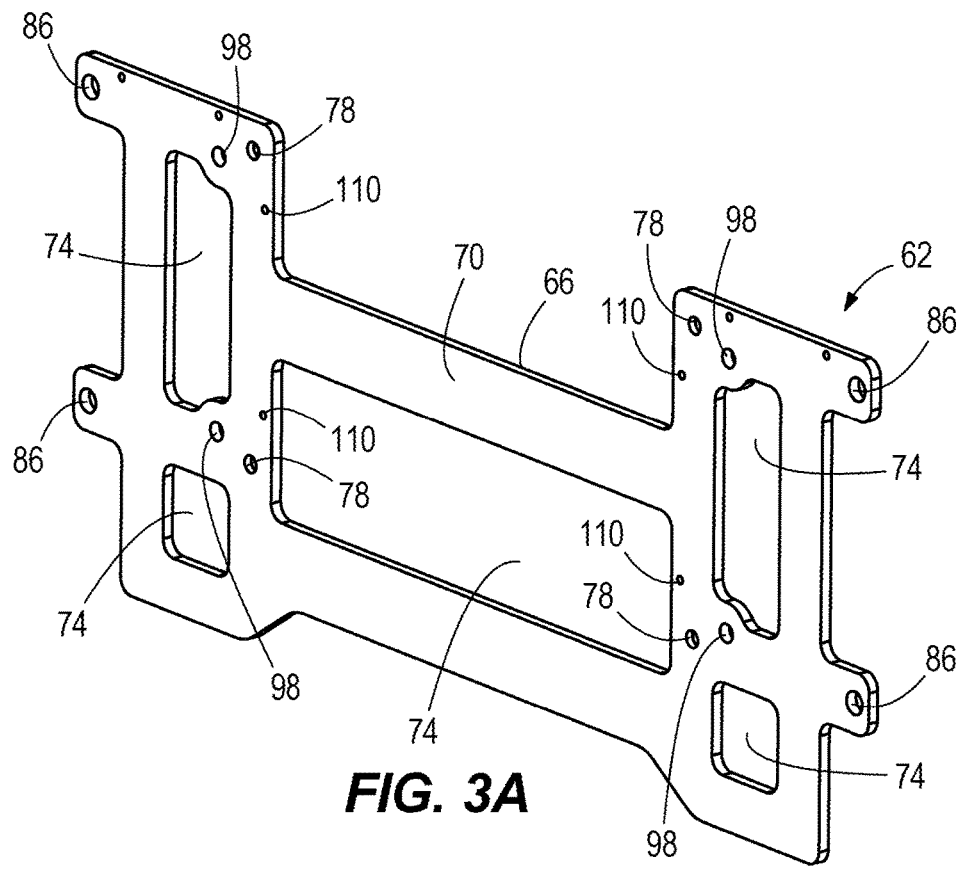
FIG. 3A is a perspective view of a mounting plate of the modular machine system of FIG. 1 showing the outwardly facing side of the mounting plate.
Figure 3B:
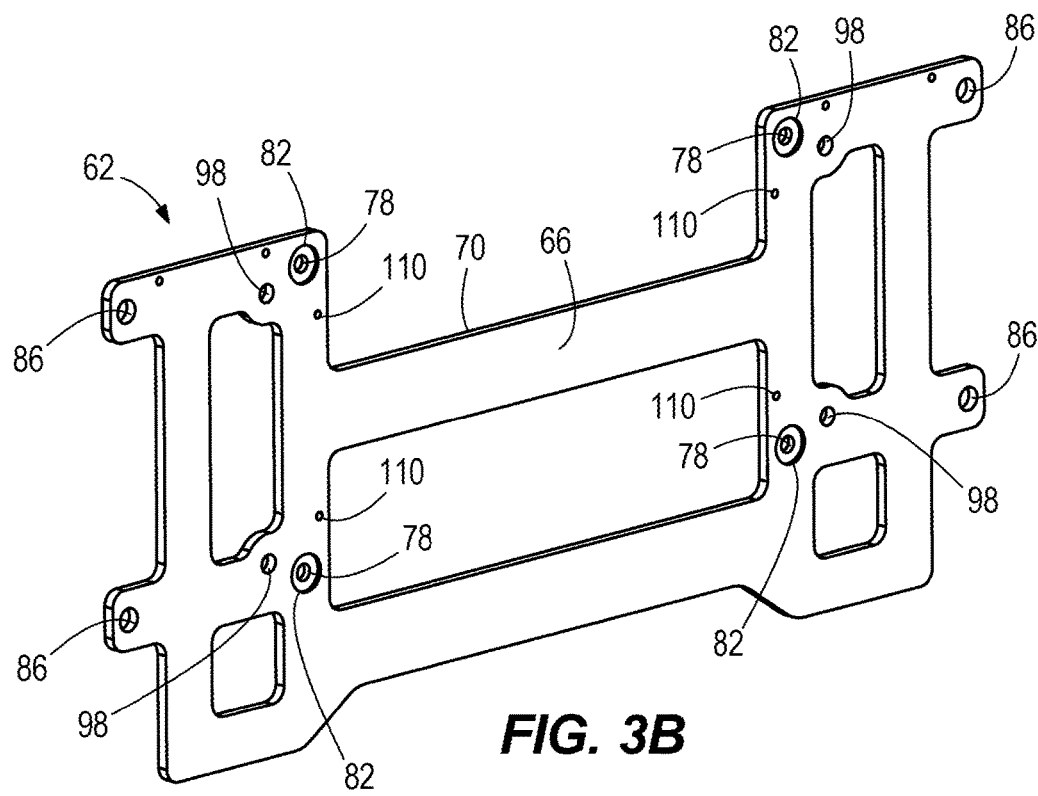
FIG. 3B is a perspective view of the mounting plate of the modular machine system of FIG. 1 showing the inwardly facing side of the mounting plate.
Figure 3C:
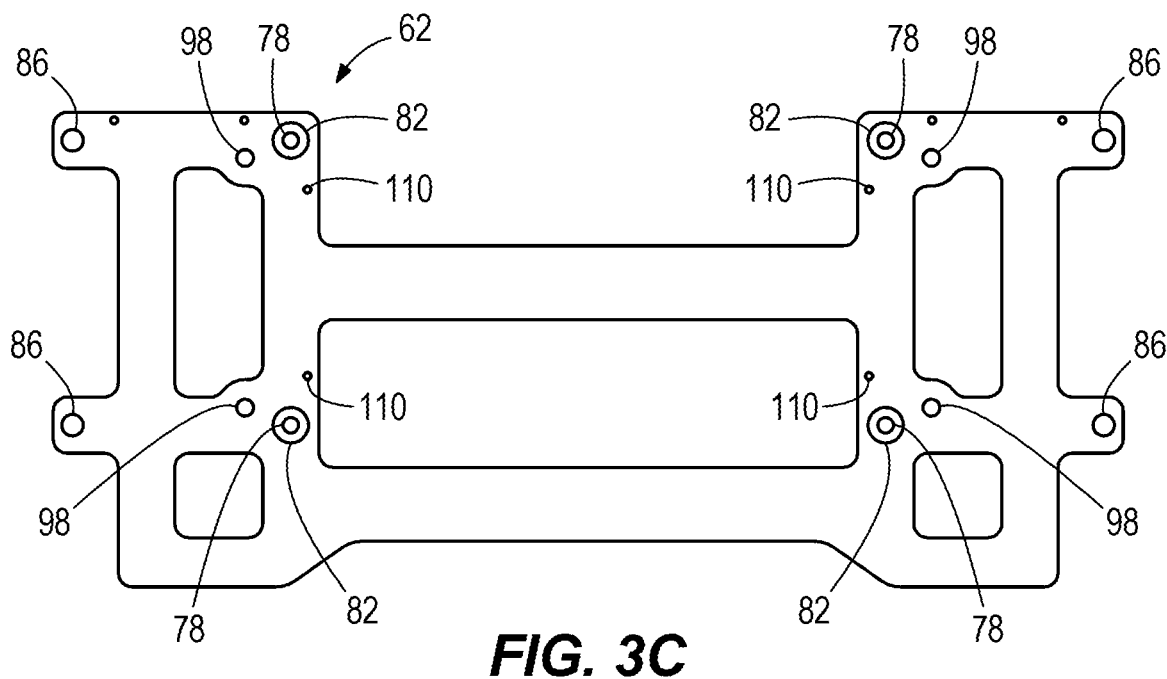
FIG. 3C is an end view of the mounting plate of the modular machine system of FIG. 1 showing the inwardly facing side of the mounting plate.
Figure 3D:
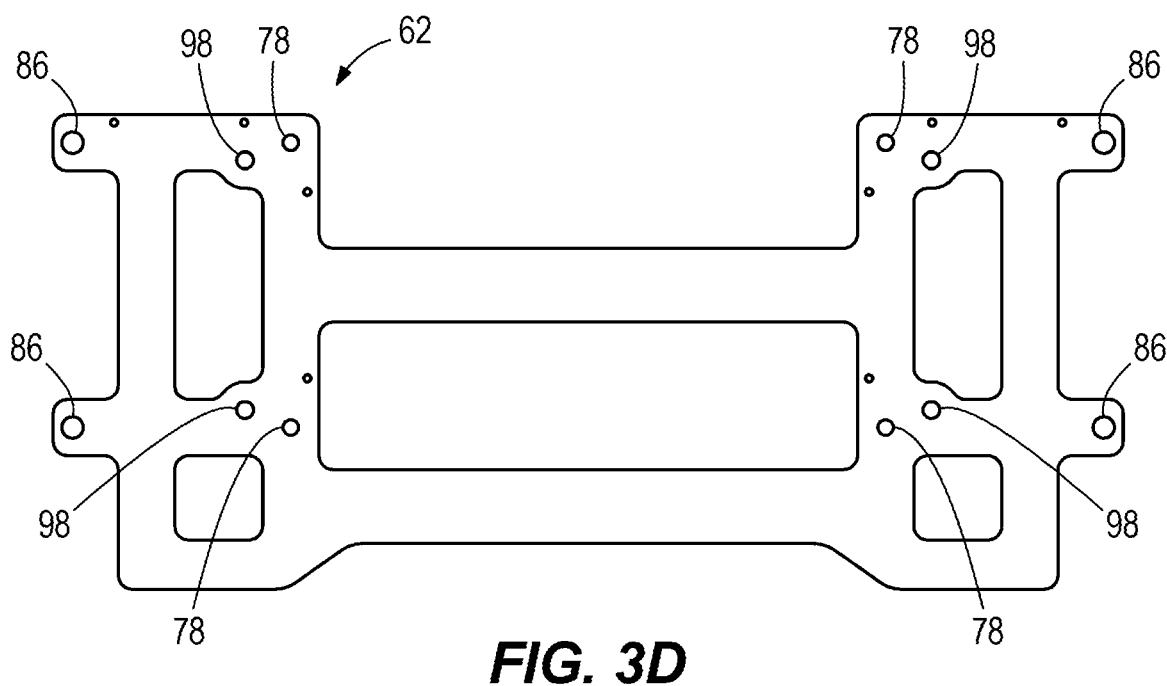
FIG. 3D is an end view of the mounting plate of the modular machine system of FIG. 1 showing the outwardly facing side of the mounting plate.

As illustrated in FIG. 3, the frame 14 further comprises a guard door 61 located on a lateral side of the frame 14 corresponding with the first lateral end 34a. The guard door 61 is connected to the frame 14 by a hinge 61a. As such, the guard door 61 is pivotable relative to the frame 14 to permit or restrict access to the interior of the frame 14. As user may pivot the guard door 61 by a handle 61b located on an opposite side of the guard door 61 as the hinge 61a.

With continued reference to FIG. 3, the frame 14 of the module 10a further comprises mounting plates 62 connected to adjacent columns 26 in the lateral direction (i.e., columns aligned by a common lateral axis 21). Each frame 14 includes an upstream mounting plate 62a and a downstream mounting plate 62b. The upstream mounting plate 62a is located adjacent the upstream end 30a of the longitudinal members 30, and the downstream mounting plate 62b is located adjacent the downstream end 30b of the longitudinal members 30.

FIGS. 3A-3D illustrate one of the mounting plates 62 in detail. The mounting plate 62 includes an inwardly facing side 66 which faces the center of the frame 14 (i.e., towards the center of the frame 14 in the longitudinal direction along the longitudinal axis 20) and an outwardly facing side 70 which faces away from the center of the frame 14 (i.e., away from the center of the frame 14 in the longitudinal direction along the longitudinal axis 20). The mounting plate 62 includes a number of voids or cutouts 74 configured to reduce the weight of the mounting plate 62 and permit passage of objects through the cutouts 74.

With continued reference to FIGS. 3A-3D, the mounting plate 62 includes four rail holes 78 in the form of through holes passing through the inwardly facing side 66 to the outwardly facing side 70. In the illustrated embodiment, the rail holes 78 are counterbored rail holes 78 with counterbore surfaces 82 on the inwardly facing side 66. In the illustrated embodiment, the rail holes 78 are parallel to the longitudinal axis 20. The counterbore surfaces 82 are perpendicular to the longitudinal axis 20. In the illustrated embodiment, the rail holes 78 are positioned in a rectangular array along a plane that extends parallel to the vertical axis 22 and the lateral axis 21. The rail holes 78 may be otherwise located in the mounting plate 62 so long as they are parallel to the longitudinal axis 20.

With continued reference to FIGS. 3A-3D, the mounting plate 62 includes four column holes 86 configured for attaching the mounting plate 62 to two adjacent columns 26 in the lateral direction (i.e., columns at a common longitudinal position and spaced apart parallel to the lateral axis 21). In the illustrated embodiment, the column holes 86 are also positioned in a rectangular array. In the illustrated embodiment, the column holes 86 are located more laterally spread apart than the rail holes 78, but otherwise at a same common height relative to the work surface W.

As illustrated in FIG. 6, fasteners 94 extend through the column holes 86 to connect the mounting plate 62 to the channel arms 50, 54 of the each of the two adjacent columns 26 in the lateral direction (i.e., columns at a common longitudinal position and spaced apart parallel to the lateral axis 21). In the illustrated embodiment, the fasteners 94 extend through both of the channel arms 50, 54 along the longitudinal direction. As such, the mounting plate 62 is secured to the frame 14 within the periphery 38a of the frame 14 of the first module 10a. Additionally, when mounted to the frame 14, the mounting plate 62 is generally planar with a plane defined by the vertical axis 22 and the lateral axis 21.

With continued reference to FIG. 6, each of the fasteners 94 include a first bolt 94a and a second bolt 94b on either longitudinal side of the mounting plate 62. Each fastener 94 may include an isolator 94c positioned longitudinally between the first bolt 94a and the mounting plate 62. The fastener 94 may further include another isolator 94c positioned longitudinally between the second bolt 94b and the mounting plate 62. The isolator 94c may permit the mounting plate 62 to deflect axially along the longitudinal axis 20 as required to retain axial alignment of the rails 18 of adjacent modules 10a, 10b. The isolators 94c are elastomeric or otherwise deflectable to permit axial deflection of the mounting plate 62. In the illustrated embodiment, fasters 94 include isolators 94c on one lateral side of the apparatus 10. In other words, the isolators 94c are applied only to the fasteners 94 which connect mounting plate 62 to two adjacent columns 26 in the longitudinal direction (i.e., columns at a common lateral position spaced apart parallel to the longitudinal axis 20).

With continued reference to FIGS. 3A-3D, the mounting plate 62 includes four spacer holes 98 configured for attaching the downstream mounting plate 62b of the first module 10a to the upstream mounting plate 62a of the second module 10b. In the illustrated embodiment, the spacer holes 98 are also positioned in a rectangular array. In the illustrated embodiment, each of the spacer holes 98 are located at a lateral position between the rail holes 78 and the column holes 86 and at a vertical position between the common height of the rail holes 78 and the column holes 86.

As illustrated in FIG. 6, spacers 102 are configured to space the downstream mounting plate 62b of the first module 10a from the upstream mounting plate 62a of the second module 10b. In the illustrated embodiment, the spacers 102 are located between, e.g., directly between, the downstream mounting plate 62b of the first module 10a and the upstream mounting plate 62a of the second module 10b. The spacers 102 are fastened to the downstream mounting plate 62b of the first module 10a and the upstream mounting plate 62a of the second module 10b to set an axial position (or in other words, inhibit axial deflection) of the first module 10a relative to the second module 10b parallel to the longitudinal axis 20. In the illustrated embodiment, the spacers 102 define a mechanically bolted interface between the downstream mounting plate 62b of the first module 10a and the upstream mounting plate 62a of the second module 10b. In the illustrated embodiment, the spacers 102 have axial ends which are engaged by bolts 102a, 102b such that the spacers 102 act as two-sided nuts connecting the bolts 102a, 102b to form an attachment between the first module 10a and the second module 10b independent of the rails 18. The bolts 102a, 102b rest upon the inwardly facing surface 66 of the respective mounting plates 62 of the first and second modules 10a, 10b.

Figure 2:
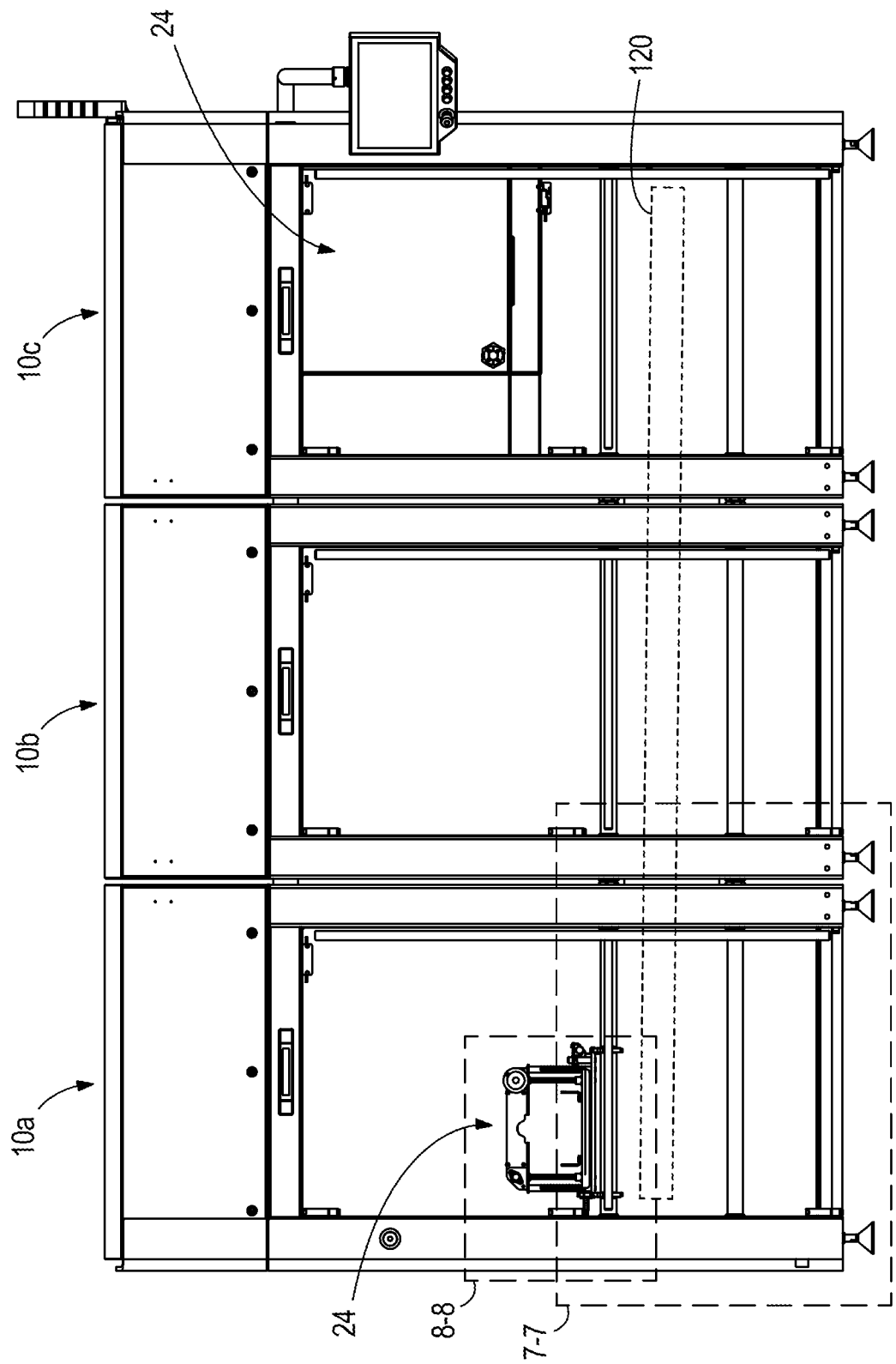
FIG. 2 is a front view of the modular machine system of FIG. 1.
Figure 7:
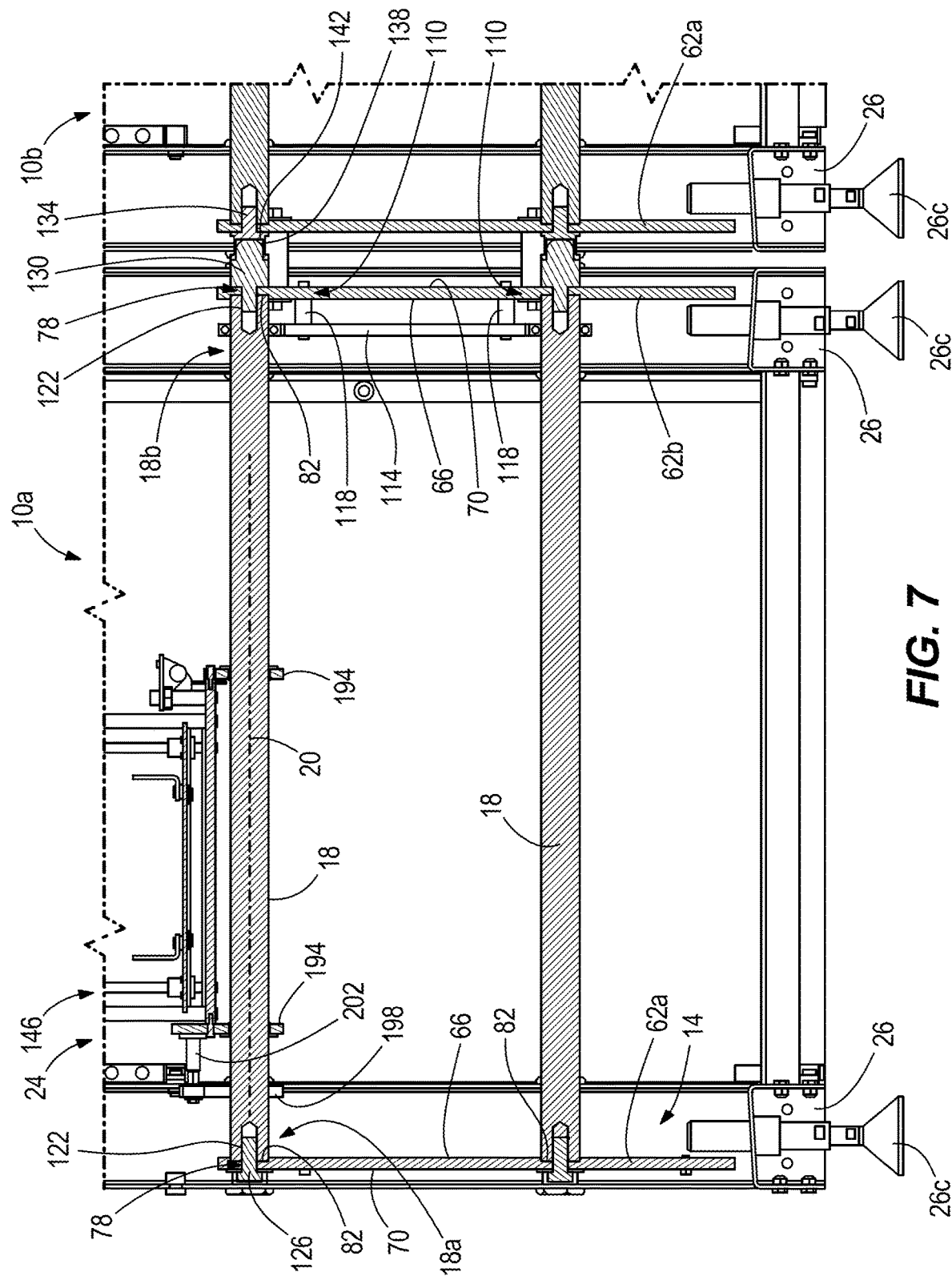
FIG. 7 is an enlarged cross-sectional view of the modular machine system of FIG. 1 taken along section line 7-7 in FIG. 4.

Finally, with reference to FIGS. 3A-3D and reference to FIG. 3, the mounting plate 62 includes four conveyor mount holes 110 configured for attaching a conveyor mount 114 to both the mounting plate 62 and the rails 18. The conveyor mount 114 is best illustrated in FIGS. 3 and 7. The conveyor mount 114 circumscribes the rails 18 (FIG. 3), and is further attached to the frame 14 through fasteners 118 which secure the conveyor mount 114 to the conveyor mount holes 110 of the mounting plate 62 (FIG. 7). The conveyor mount 114 is configured to support a conveyor 120 (FIG. 2) on the apparatus 10.

The conveyor 120 (FIG. 2) is configured to pass the cup between successive modules 10a-10c of the apparatus 10 such that the process unit 24 within each successive module 10a-10c completes a successive task on the cup. The cup may be substituted for another work piece in realms outside of cup filling and sealing. The conveyor 120 may be an intermittent conveyor capable of conveying and stopping at a process unit 24 for the process unit 24 to complete the task on the cup. The intermittent conveyor 120 may convey an index length along the longitudinal axis 20 before stopping at a process unit 24.

As best illustrated in FIG. 7, the rails 18 each have an upstream end 18a and a downstream end 18b. The upstream end 18a and the downstream end 18b each have a receiver 122 at an axial end thereof. The receiver 122 extends parallel to the longitudinal axis 20 towards the center of the rail 18 from the respective end 18a, 18b. The receivers 122 can be blind threaded holes in some constructions, as illustrated. The outboard alignment feature 126 and the inboard alignment features 130, 134 include shafts which are configured to engage the receiver 122 to secure the outboard alignment feature 126 and the inboard alignment features 130, 134 to the rails 18. The outboard alignment feature 126 and the inboard alignment features 130, 134 can be threaded shafts which engage the blind threaded holes of the receivers 122, as illustrated.

In the case of the modules 10a, 10b illustrated in FIG. 7, the upstream end 18a is received axially by the counterbored surfaces 82 of the holes 78 with the upstream end 18a abutting the counterbored surface 82 recessed from the inwardly facing surface 66 of the upstream mounting plate 62a. An outboard alignment feature 126 engages the receiver 122 of the upstream end 18a and the upstream mounting plate 62a to connect the rail 18 to the upstream mounting plate 62a, and thus, the frame 14. Similarly, the downstream end 18b is received axially by the counterbored surfaces 82 of the holes 78 with the downstream end 18b abutting the counterbored surface 82 recessed from the inwardly facing surface 66 of the downstream mounting plate 62b.

With continued reference to FIG. 7, a first inboard alignment feature 130 (i.e., a first alignment feature) is connected to the downstream end 18b of the first module 10a. The first inboard alignment feature 130 secures the downstream end 18b of the rail 18 of the first module 10a to the downstream mounting plate 62b of the first module 10a. The first inboard alignment feature 130 protrudes axially from the outwardly facing side 70 of the downstream mounting plate 62b of the first module 10a. A second inboard alignment feature 134 (i.e., a second alignment feature) is connected to the upstream end 18a of the second module 10b. The second inboard alignment feature 134 secures the upstream end 18a of the rail 18 of the second module 10b to the upstream mounting plate 62a of the second module 10b. The second inboard alignment feature 134 protrudes axially from the outwardly facing side 70 of the upstream mounting plate 62a of the first module 10a.

With reference to FIG. 7, in the assembly of the modules 10a, 10b, the rails 18 of the first module 10a and the second module 10b are aligned in coaxial pairs (e.g., four pairs), and all the rails 18 are parallel with the longitudinal axis 20—or in other words, define four parallel longitudinal axes. Axial clearance between the modules 10a, 10b is taken up until the inboard alignment features 130, 134 engage each other. Any remaining slack is taken up between the first module 10a and the second module 10b as the spacers 102 are tightened. This process is repeated for each aligned set of rails 18 between the two modules 10a, 10b. As such, the rail 18 of the first module 10a is coaxially and longitudinally secured to the rail 18 of the second module 10b with all of the rails 18 of both the first module 10a and the second module 10b being parallel to the longitudinal axis 20.

In the illustrated embodiment of FIG. 7, the first and second inboard alignment features 130, 134, are, respectively, male and female connectors. In the assembly of the apparatus 10, the first and second inboard alignment features 130, 134, as well as the outboard alignment feature 126, are coaxial (i.e., positioned along) with the longitudinal axis 20. The spacers 102 are removable from the mounting plates 62 of the first module 10a and the second module 10b such that the second module 10b is separable from the first module 10a. The first and second inboard alignment features 130, 134 extend through the rail holes 78 of the downstream mounting plate 62b of the first module 10a and of the upstream mounting plate 62a of the second module 10b, respectively.

With continued reference of FIG. 7, the male first inboard alignment feature 130 includes an outwardly projecting surface 138. As typical with female connectors, the female second inboard alignment feature 134 defines a void 142 operable to receive the outwardly projecting surface 138 of the first inboard alignment feature 130. In the illustrated embodiment, the outwardly projecting surface 138 is received within the void 142 to align the rail 18 of the second module 10b with the rail 18 of the first module 10a. When the outwardly projecting surface 138 is received within the void 142, it is said that the outwardly projecting surface 138 is secured with the void 142. Optionally, the outwardly projecting surface 138 is rounded or conical such that when the outwardly projecting surface 138 and the void 142 contact each other, the rounded or conical outwardly projecting surface 138 forces alignment of the rail 18 of the first module 10a with the rail 18 of the second module 10b. In the apparatus 10, the entirety of both outwardly projecting surface 138 and the void 142 are positioned between the downstream mounting plate 62b of the first module 10a and the upstream mounting plate 62a of the second module 10b.

With continued reference of FIG. 7, the outboard alignment feature 126, the male first inboard alignment feature 130, and the female second inboard alignment feature 134 are each made from 303 stainless steel. In other embodiments, the outboard and inboard alignment features 126, 130, 134 may be made from 304 or 316 stainless steel. In the illustrated embodiment, the male first inboard alignment feature 130 has an outer diameter of 35 mm +0/−0.1 mm. In the illustrated embodiment, the female first inboard alignment feature has an inner diameter of 35.1 mm +0.1/−0 mm. This permits the first inboard alignment feature 130 to nest within the second inboard alignment feature 134. In other embodiments, the materials, diameters, and tolerances of the first and second inboard alignment features 130, 134 may differ based on other design parameters of the apparatus 10.

As illustrated in FIG. 3, the connection between the rails 18 of second module 10b and the rails 18 of the third module 10c follows the same format as described with respect to the connection between the rails 18 of the first module 10a and the second module 10b. Both connections utilize the first and second inboard alignment features 130, 134. Successive modules 10d attached to the third module 10c also follow the same format as described with respect to the first module 10a and the second module 10b.

The apparatus 10 includes the conveyor mounted on the conveyor mount 114 and functioning in conjunction with the rails 18 to pass the cup between the process units 24 mounted within each module 10a-10c for each module to successively complete a task associated with filling the cup with a comestible and sealing the comestibles within the cup from the environment. The conveyor 120 is configured to hold, carry, and discharge various sized cups so to pass the cup between each of the process units 24 mounted within each of the modules 10a-10c. Other process units not related to cup filling and sealing may also be placed within the modules 10a-10c of the frame 14 for use with the conveyor 120.

The cup may be made of, for example, a thermoplastic such as polypropylene or polyethylene. Alternately, the cup material can be coated or uncoated paper, and the cup may be compostable. In some constructions, the cup is partially or entirely constructed from recycled materials. The cup may be filled with a comestible. The comestible can be in liquid or semi-liquid form. For example, the comestible may be orange juice, tomato juice, milk, ice cream, soft drinks, gelatin type desserts, salads, and other types of food. The cups are provided with tapered (e.g., truncated cone) walls having an enlarged upper open end having a thickened or rolled lip. The cup may be shaped in many ways. Common shapes for cups include square or rectangular cups with single or multiple cavities. The cups may be round cups that vary in diameter, height, and taper. Oval cups and cups that are joined to form multiple individual containers separated by the end user for single use are also conceived. In some instances, and especially when the cups are asymmetric, there may be a need for consistent orientation of the cup during processing in the cup filling and sealing apparatus 10. A cover (sometimes referred to as a "seal") that closes the open end of the cup may be applied to the lip. As such, the cup is closed and sealed by the cover to prevent spilling and contamination of the comestibles or other contents within the cup. The cover can be made from, for example, foil, plastic, or an organic film, and/or a coated paper or plastic.

As previously mentioned, process units 24 may be mounted to the rails 18 for operation in each module 10a-10c of the apparatus 10. Each process unit 24 may be mounted within any of the modules 10a-10c so long as the axial length of the module 10a-10c is appropriate for the process unit 24. For example, a single process unit 24 can be mounted on the rails 18 of the module 10a, removed from the module 10a, and replaced into engagement with the rails 18 of the second module 10b. As previously mentioned, multiple process units 24 may be positioned within a single module 10a-10c. In the illustrated embodiment, each rail 18 has a common cross-section to permit usage of the rail 18 within any of the modules 10a-10c and permit interchangeable attachment of the process unit 24 onto the rails 18 within any of the modules 10a-10c. For example, the illustrated rails 18 all have a circular cross-section taken perpendicular to the longitudinal axis 20. It is also noted that the rails 18 may be of solid material (e.g., metal) cross-section with the exception of the ends 18a, 18b.

Each process unit 24 functions in conjunction with the conveyor 120 to complete a task associated with cup filling and sealing on the cup. For example, the process unit 24 within the module 10a receives the cup from the conveyor 120, and completes a first task on the cup. Then, the process unit 24 returns the cup to the conveyor 120. The cup is passed to the next module 10b by the conveyor 120 for completing the successive task, and so on. As such, each process unit 24 accomplishes at least one task of a series of tasks of the cup filling and sealing apparatus 10.

Figure 9:
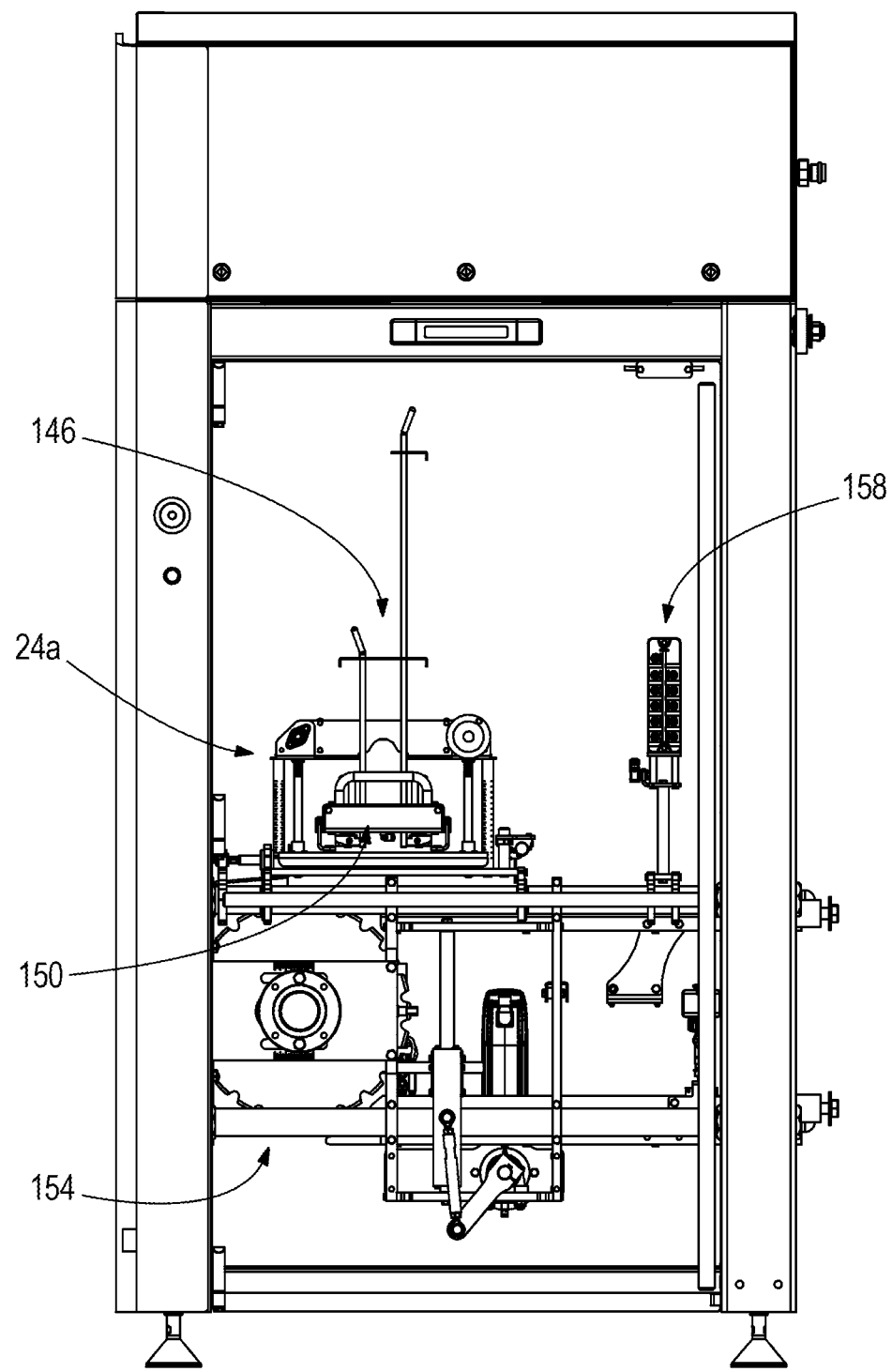
FIG. 9 is a side view of an infeed process unit mounted within a module of the modular machine system of FIG. 1.

FIG. 9 illustrates an infeed process unit 24a. The infeed process unit 24a functions as a point of access on the apparatus 10 where cups are loaded into a magazine 146, and individually dispensed into a carrier plate 150 (i.e., a cup holder). A vacuum pull down station 154 may be used to assist in placing the cups into the carrier plate 150 so that it the cups are properly aligned within the carrier plate 150. As the conveyor indexes the carrier plates 150 (i.e., translates the carrier plates 150 along the longitudinal axis 20), a series of sensors 158 are used to check if there are multiple cups in a single carrier plate 150 pocket, or if a cup is missing entirely.

Figure 10:
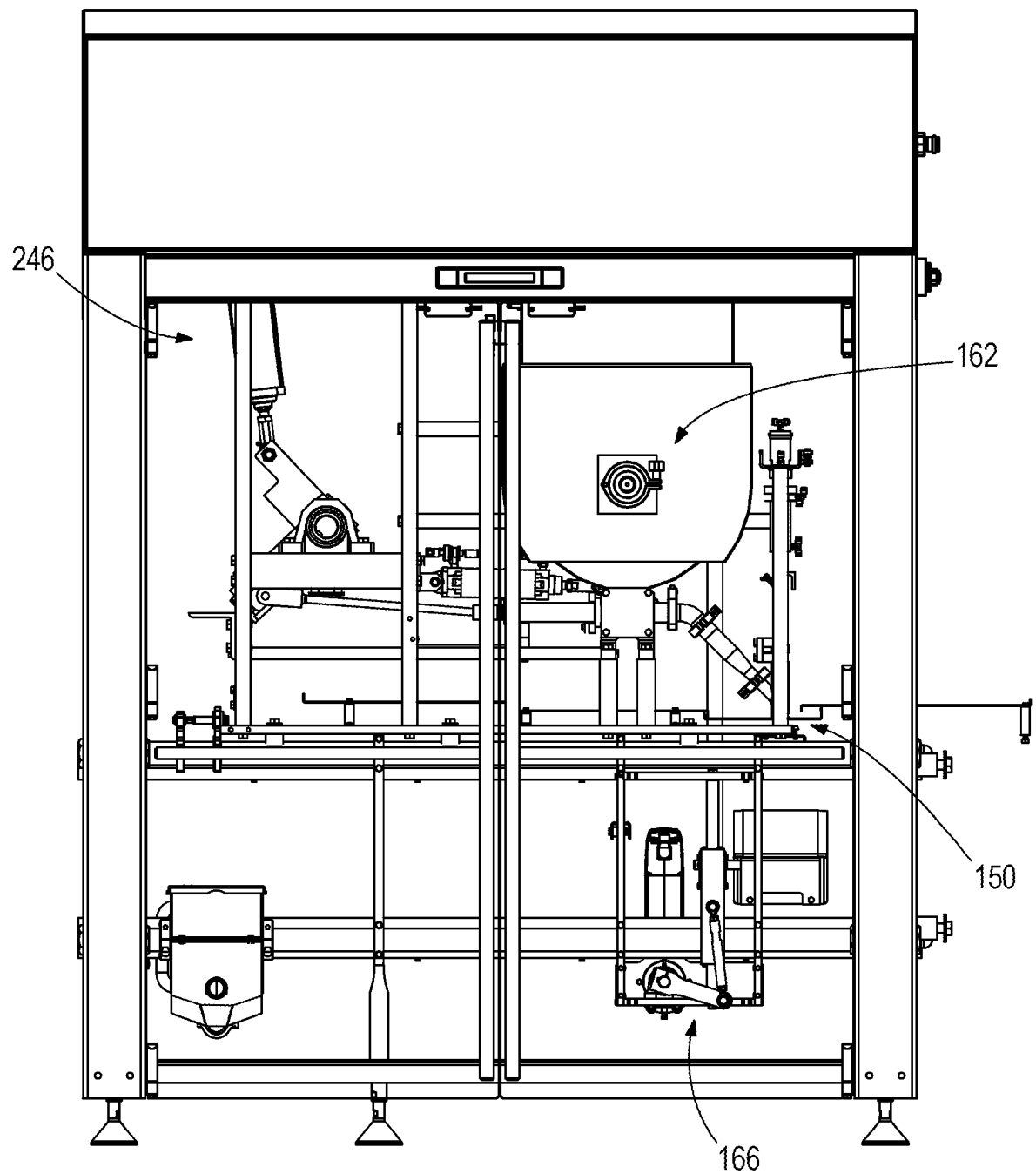
FIG. 10 is a side view of a dosing process unit mounted within a module of the modular machine system of FIG. 1.

FIG. 10 illustrates a dosing process unit 24b. The dosing process unit 24b contains a pump apparatus 162 that doses a particular product (e.g., yogurt, cream cheese, sour cream, etc.) into the cup. A fill lift mechanism 166 may be employed within this module to assist in lifting the cups partially out of the carrier plate 150 to prevent product splashing out of the cups.

Figure 11:
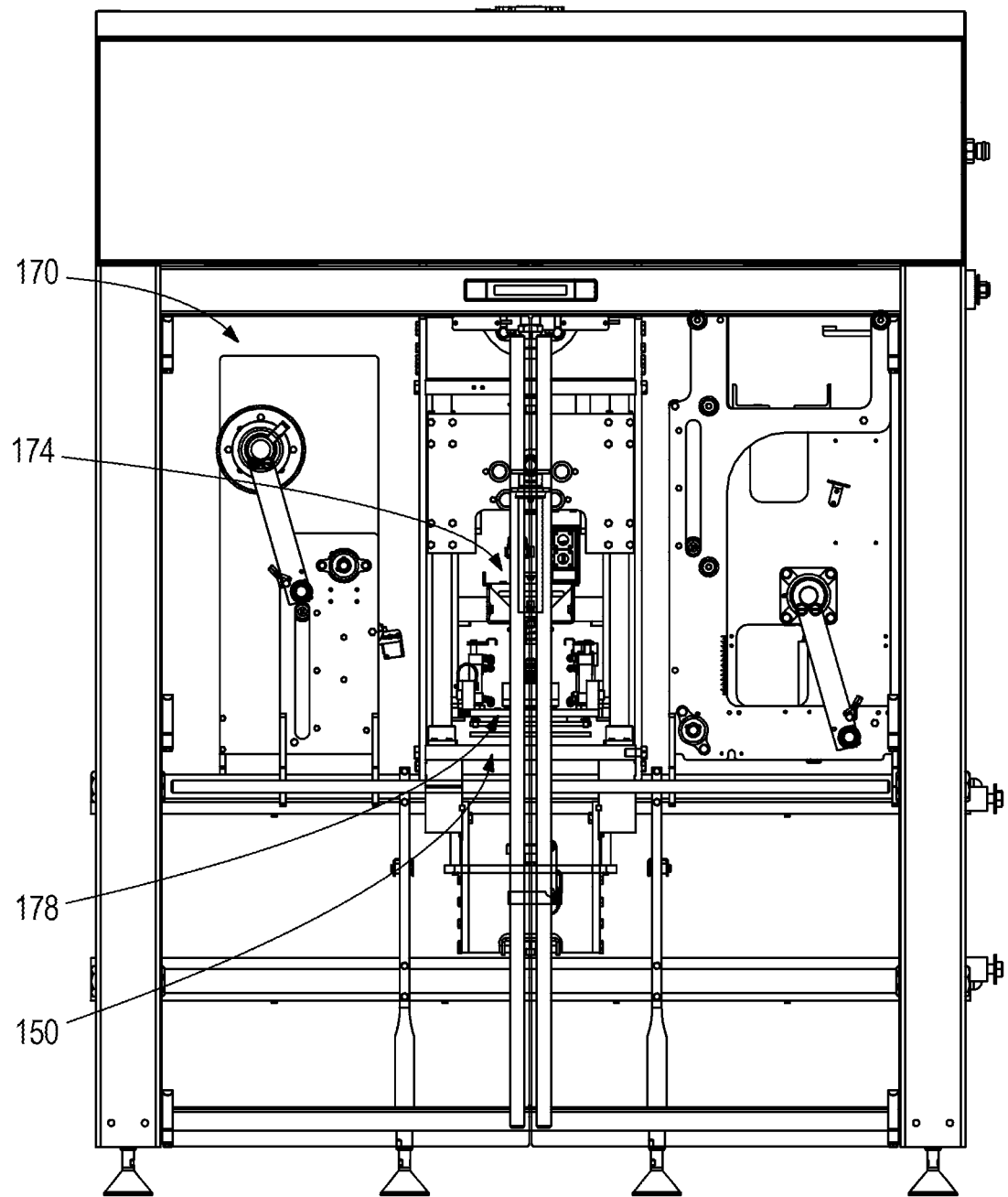
FIG. 11 is a side view of a sealing process unit mounted within a module of the modular machine system of FIG. 1.

FIG. 11 illustrates a sealing process unit 24c. The sealing process unit 24c contains a cup sealing apparatus 170 configured to apply a sealing material (as described above), which may be metallic foil lids or a roll stock film, to the top of the cup. The cup sealing apparatus 170 is operable to positively seal the cup through a combination of heat and pressure, provided by a drive mechanism 174 and heater heads 178. In one embodiment of the sealing process unit 24c, the heater heads 178 are configured to float to align with a cup that is misaligned relative to the carrier plate 150.

Figure 12:
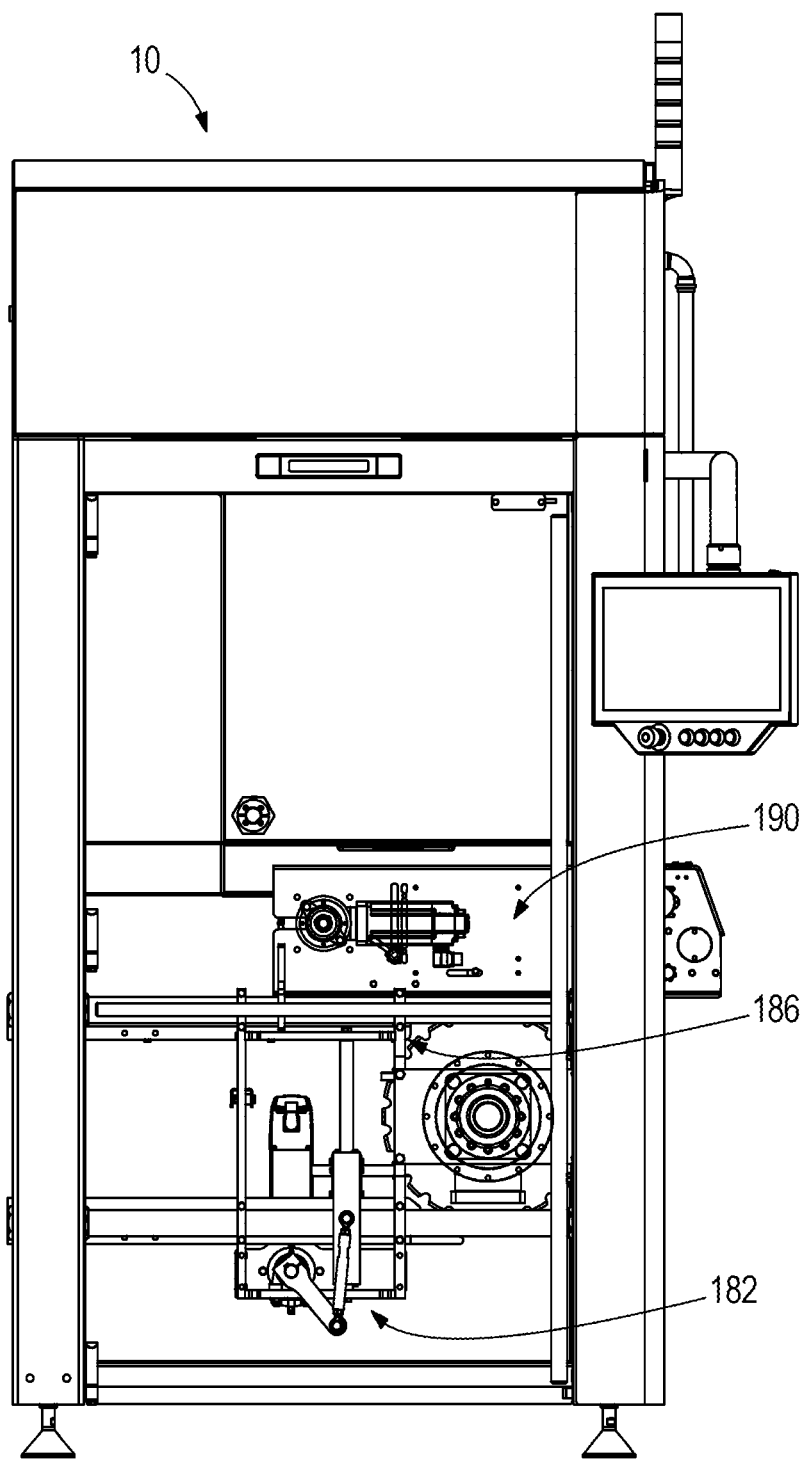
FIG. 12 is a side view of a discharge process unit mounted within a module of the modular machine system of FIG. 1.

FIG. 12 illustrates a discharge process unit 24d. The discharge process unit 24d provides for the sealed cups to be discharged from the apparatus 10 and onto other equipment, such as a stand-alone belted conveyor (not shown). A lift out station 182 is typically used to fully lift the cups out of the carrier plates 150 into a position for which the cups are able to be swept off of the lift out station 182, out of pedestals 186, and through a discharge sweep station 190 to be exited from the apparatus 10.

Figure 4:
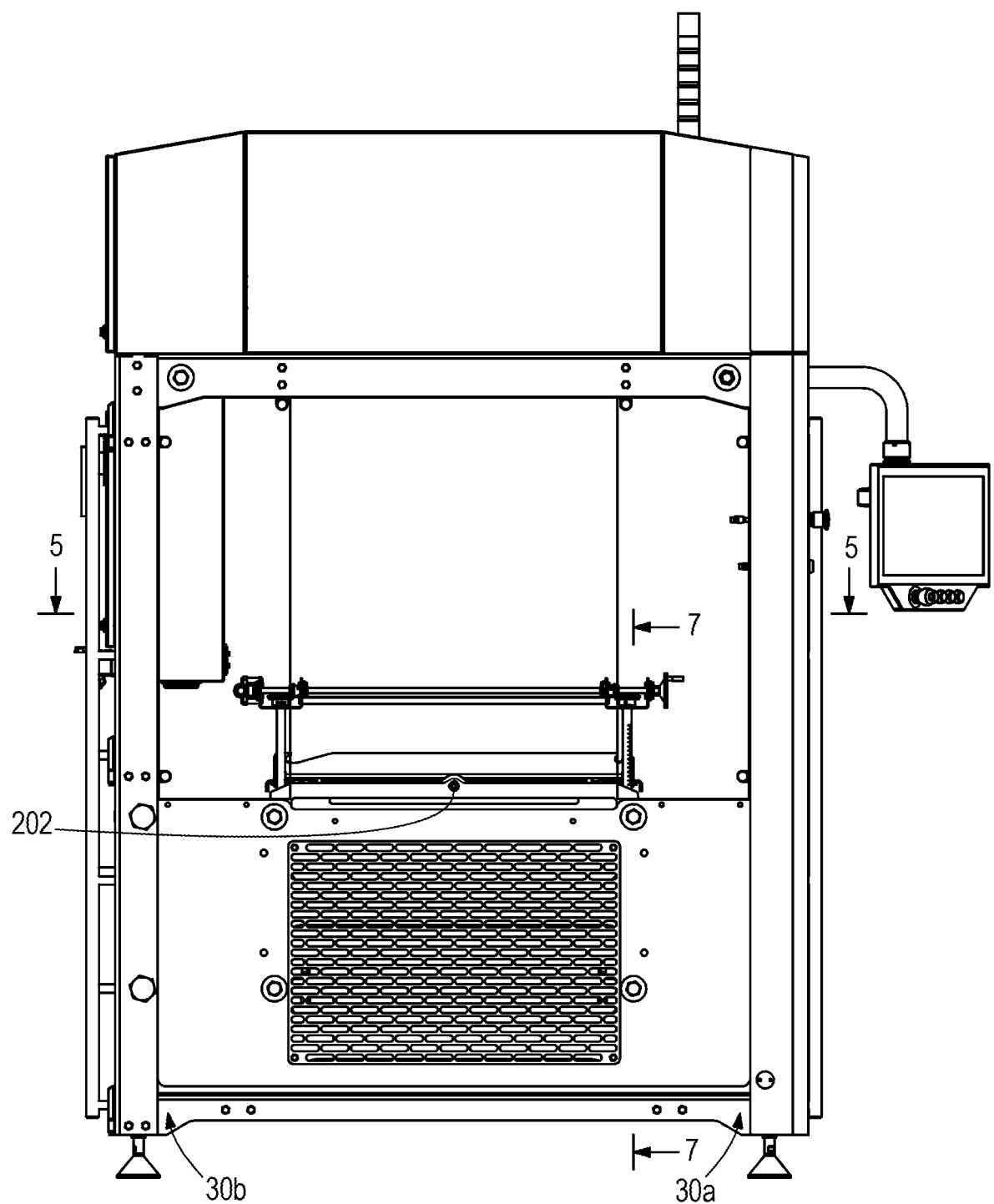
FIG. 4 is a side view of the modular machine system of FIG. 1.
Figure 8:
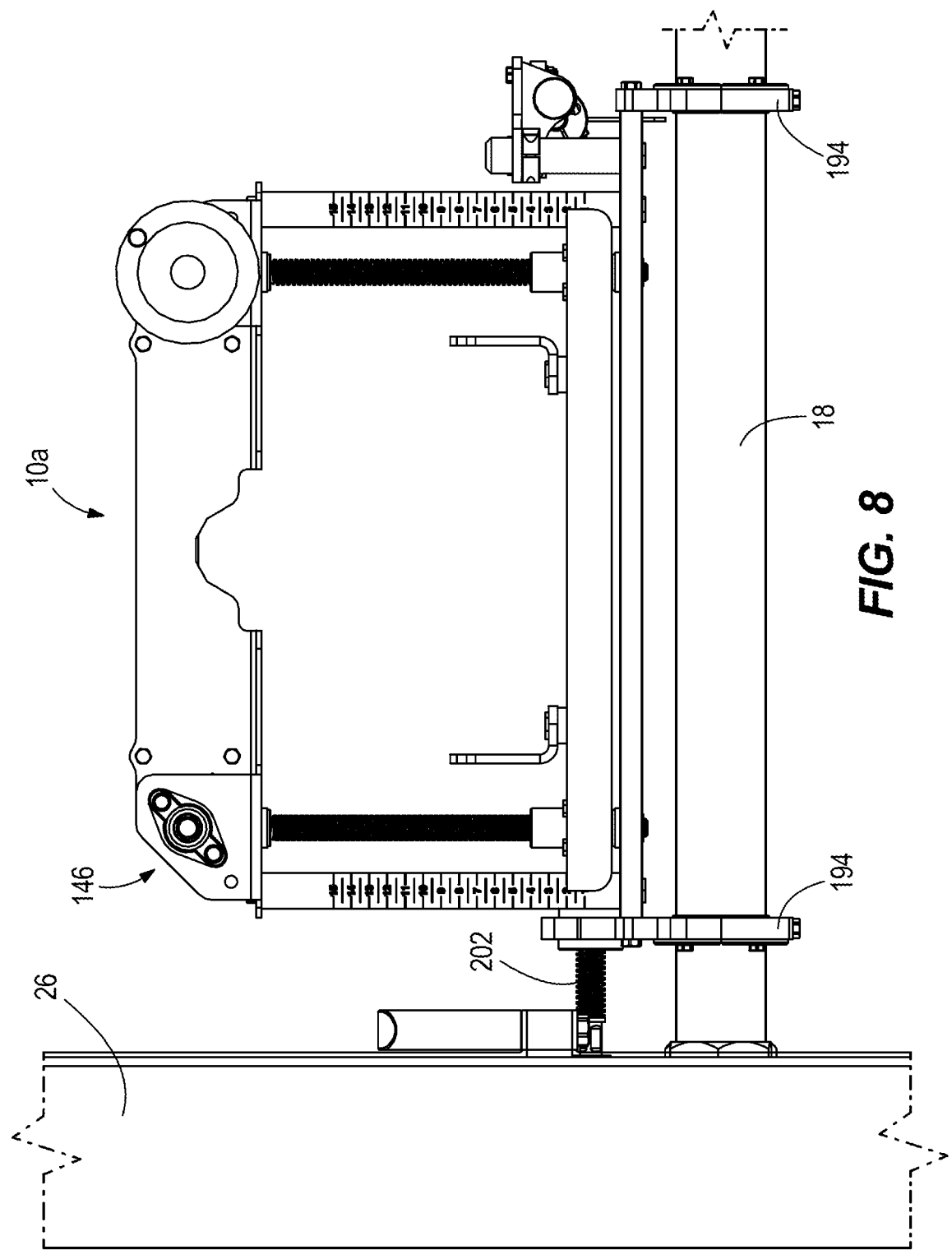
FIG. 8 is an enlarged side view of the modular machine system of FIG. 1 taken along section line 8-8 in FIG. 2.

Returning to FIGS. 7 and 8, a portion of the magazine 146 is illustrated. The magazine 146 is supported on the rails 18 by a longitudinal alignment plate 194. In the illustrated embodiment, there are two longitudinal alignment plates 194 connecting the magazine 146 to two upper rails 18 of the first module 10a. The alignment plates 194 are loosely fitted around the rails 18 to permit longitudinal translation of the magazine 146 along the longitudinal axis 20 upon receiving a threshold force along the longitudinal axis 20, but to inhibit motion of the magazine 146 along the longitudinal axis 20 upon receiving a force lower than the threshold force along the longitudinal axis 20 (e.g., during operation of the magazine 146). Another alignment plate 198 is fastened to the upper rails 18 at a fixed position along the longitudinal axis 20. A jack screw 202 connects the alignment plate 194 to the alignment plate 198, and the jack screw 202 is operable to apply the threshold force to move the alignment plate 194 relative to the alignment plate 198. As such, the magazine 146 is movable along the rails 18 by operation of the jack screw 202. The magazine 146 may have additional adjustable features to locate the magazine 146 in an operable position aligned with the vacuum pull down station 154. As illustrated in FIG. 4, the jack screw 202 is located between the first and second lateral ends 34a, 34b of the module 10a, for example in a laterally central region or lateral center position. As such, the alignment process using the jack screw 202 can be carried out by a technician from either lateral side of the apparatus 10, not only from a single designated service side of the apparatus 10. Moreover, the alignment plates 194, 198 and the jack screw 202 may dispense with any individual alignment mechanisms that align portions separately, ensuring that the magazine 146 maintains a consistent orientation on the rails 18 during longitudinal alignment. The magazine 146 may be replaced with a component of or an entirely different functional process unit 24 such that the different functional process unit 24 is movable along the longitudinal axis 20 as described above with respect to the magazine 146.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

Various features of the invention are set forth in the following claims.

What is claimed is:

1. A modular processing machine including a plurality of process units for completing a series of sequential tasks on a work piece conveyed through the modular processing machine, the modular processing machine comprising:
    a first module including,
        a first mounting plate including a first hole, and
        a first rail extending along a longitudinal axis, the first rail having a first axial end facing the first hole, the first hole being coaxially aligned with the longitudinal axis; and
    a second module including,
        a second mounting plate including a second hole coaxially aligned with the longitudinal axis, and
        a second rail extending coaxially with the longitudinal axis, the second rail having a second axial end facing the second hole,
    wherein the first rail has a first alignment feature at the first axial end thereof protruding longitudinally from the first hole, and the second rail has a second alignment feature at the second axial end thereof protruding longitudinally from the second hole, and the first alignment feature is engaged with the second alignment feature to coaxially align the first rail with the second rail along the longitudinal axis.

2. The modular processing machine of claim 1, wherein the first hole defines a counterbore surface in an inwardly facing side of the first mounting plate which faces towards the center of the first module, and the first axial end of the first rail rests upon the counterbore surface axially.

3. The modular processing machine of claim 1, wherein the first mounting plate includes a conveyor mount hole, and a conveyor mount is attached to at least the first rail and the conveyor mount hole.

4. The modular processing machine of claim 1, wherein the first module further comprises a column, and the first mounting plate is mounted to the column.

5. The modular processing machine of claim 4, wherein the column includes
    a first channel arm,
    a second channel arm, and
    a channel body spanning the first and second channel arms,
    wherein the first and second channel arms extend perpendicularly from the longitudinal axis, and a fastener which fastens the first mounting plate to the first column extends parallel to the longitudinal axis through at least the first channel arm and the second channel arm.

6. The modular processing machine of claim 4, wherein the first module further includes an additional column positioned with the first column at a first longitudinal end of the first module, and the first module further includes two additional columns positioned at a second longitudinal end of the first module, the first mounting plate being fastened to the two additional columns at the second longitudinal end of the first module.

7. The modular processing machine of claim 6, wherein the first module further includes an additional mounting plate fastened to the column and the additional column at the first longitudinal end of the first module.

8. The modular processing machine of claim 6, wherein the first module further includes longitudinal members extending parallel to the longitudinal axis and lateral members extending perpendicular to the longitudinal axis to connect each of the column, the additional column, and the two additional columns to each other.

9. The modular processing machine of claim 1, wherein the first rail is one of a plurality of parallel rails provided in an array across the first module, each of the plurality of parallel rails extending parallel to the longitudinal axis.

10. The modular processing machine of claim 1, wherein the first mounting plate is fastened to the second plate by a spacer which extends parallel to the longitudinal axis.

11. The modular processing machine of claim 1, further comprising a spacer located between the first mounting plate and the second mounting plate, the spacer being fastened to the first mounting plate and the second mounting plate to set an axial position of the first mounting plate relative to the second mounting plate along the longitudinal axis.

12. The modular processing machine of claim 1, wherein the first alignment feature includes an outwardly projecting surface and the second alignment feature defines a void such that when the first alignment feature and the second alignment feature contact each other, contact between the outwardly projecting surface and the void forces the second rail into alignment with the longitudinal axis.

13. The modular processing machine of claim 1, wherein the second module further includes another alignment feature at another axial end of the second rail opposite the second axial end, and the modular processing machine further comprises a third module including a third mounting plate including a third hole, and a third rail extending along the longitudinal axis, the third rail having an axial end facing the third hole, the third hole being coaxially aligned with the longitudinal axis, and the third rail has a third alignment feature at the axial end thereof, and the third alignment feature is engaged with the another alignment feature of the second rail to coaxially align the third rail with the second rail along the longitudinal axis.

14. The modular processing machine of claim 1, further comprising a conveyor mounted on the first rail and the second rail, the conveyor configured to convey the work piece from the first module to the second module between a first process unit of the first module and a second process unit of the second module.

15. The modular processing machine of claim 1, wherein the first mounting plate includes an inwardly facing surface and an outwardly facing side, the first axial end of the first rail terminates adjacent the inwardly facing surface, and the first alignment feature protrudes longitudinally from the outwardly facing side.

16. The modular processing machine of claim 15, wherein the second mounting plate includes an inwardly facing surface and an outwardly facing side, the second axial end of the second rail terminates adjacent the inwardly facing surface of the second mounting plate, and the second alignment feature protrudes longitudinally from the outwardly facing side of the second mounting plate.

17. A modular processing machine including a plurality of process units for completing a series of sequential tasks on a work piece conveyed through the modular processing machine, the modular processing machine comprising:
- a first module including,
  - a first mounting plate including a first hole, and
  - a first rail extending along a longitudinal axis, the first hole having a first axial end facing the first hole, the first hole being coaxially aligned with the longitudinal axis,
- a second module including,
  - a second mounting plate including a second hole coaxially aligned with the longitudinal axis, and
  - a second rail extending coaxially with the longitudinal axis, the second rail having a second axial end facing the second hole,
- wherein the first rail has a first alignment feature at the first axial end thereof protruding longitudinally from the first hole, and the second rail has a second alignment feature at the second axial end thereof protruding longitudinally from the second hole of the second mounting plate, and the first alignment feature is engaged with the second alignment feature to coaxially align the first rail with the second rail along the longitudinal axis,
- wherein the modular processing machine further comprises a first process unit mounted on the first rail for completing a first task of the series of sequential tasks, and
- wherein the modular processing machine further comprises a second process unit mounted on the second rail for completing a second task of the series of sequential tasks, the second task being completed sequentially after the first task.

18. The modular processing machine of claim 17, further comprising a conveyor configured to pass the workpiece between the first functional process unit and the second process unit.

19. The modular processing machine of claim 18, wherein the conveyor is an intermittent conveyor operable to stop conveying the workpiece once it reaches the first process unit.

20. The modular processing machine of claim 1, wherein the first module has an upstream end and a downstream end along the longitudinal axis, and the second module has an upstream end and a downstream end along the longitudinal axis, the upstream end of the second module located adjacent the downstream end of the first module, and the modular processing machine further comprises a conveyor operable to pass the work piece between the downstream end of the first module and the upstream end of the second module.

21. The machine frame of claim 17, wherein the first rail and the second rail have the same cross sectional profile shape such that the first process unit operable to be removably mounted on either the first rail within the first module or the second rail within the second module.

22. A modular processing machine including a plurality of process units for completing a series of sequential tasks on a work piece conveyed through the modular processing machine, the modular processing machine comprising:
- a first module including,
  - a plurality of first rails extending parallel to each other,
  - a first process unit mounted on the plurality of first rails, and
- a second module including,
  - a plurality of second rails extending parallel to each other,
  - a second process unit mounted on the plurality of second rails, and
- a conveyor extending between the first module and the second module and defining a process flow direction from an upstream end of the first module towards a downstream end of the second module,
- wherein a plurality of male-female interfaces between the plurality of first rails and the plurality of second rails sets the plurality of first rails and the plurality of second rails to extend parallel to the process flow direction, and an attachment between the first module and the second module is established by fastener joints positioned separately from the plurality of male-female interfaces in a plane perpendicular to the process flow direction.

23. The modular processing machine of claim 22, wherein in the plane, the male-female interfaces are positioned in a rectangular array and the fastener joints are positioned in a second rectangular array not in interference with the rectangular array.

24. The modular processing machine of claim 22, wherein the fastener joint is configured to be tightened to take up slack between the first module and the second module.

* * * * *